(12) United States Patent
Ikami

(10) Patent No.: US 6,927,771 B2
(45) Date of Patent: Aug. 9, 2005

(54) METHOD FOR DISPLAYING DATA ON COMPUTER SYSTEM

(75) Inventor: Shinichi Ikami, Yamato (JP)

(73) Assignee: International Business Machines Corporation, Armonk, NY (US)

(*) Notice: Subject to any disclaimer, the term of this patent is extended or adjusted under 35 U.S.C. 154(b) by 169 days.

(21) Appl. No.: 09/932,306

(22) Filed: Aug. 17, 2001

(65) Prior Publication Data

US 2002/0026247 A1 Feb. 28, 2002

(30) Foreign Application Priority Data

Aug. 24, 2000 (JP) .................................... 2000-253352

(51) Int. Cl.[7] ............................................... G09G 5/10
(52) U.S. Cl. ................................................... 345/440
(58) Field of Search ................................. 345/619, 629, 345/636, 650, 440, 440.1

(56) References Cited

U.S. PATENT DOCUMENTS

| | | | | |
|---|---|---|---|---|
| 5,226,118 A | * | 7/1993 | Baker et al. | 345/833 |
| 5,416,890 A | * | 5/1995 | Beretta | 345/590 |
| 5,555,354 A | * | 9/1996 | Strasnick et al. | 345/427 |
| 5,581,678 A | * | 12/1996 | Kahn | 345/440 |
| 5,760,785 A | * | 6/1998 | Barber et al. | 345/440 |
| 5,894,311 A | * | 4/1999 | Jackson | 345/440 |
| 6,269,325 B1 | * | 7/2001 | Lee et al. | 703/2 |
| 6,301,579 B1 | * | 10/2001 | Becker | 707/102 |
| 6,366,293 B1 | * | 4/2002 | Hamilton et al. | 345/649 |
| 6,473,084 B1 | * | 10/2002 | Phillips et al. | 345/440 |
| 6,577,323 B1 | * | 6/2003 | Jamieson et al. | 345/700 |
| 6,650,339 B1 | * | 11/2003 | Silva et al. | 345/619 |
| 6,707,454 B1 | * | 3/2004 | Barg et al. | 345/440 |
| 6,792,595 B1 | * | 9/2004 | Storistenau et al. | 717/110 |
| 2002/0030683 A1 | * | 3/2002 | Alexander | 345/440.1 |
| 2002/0097243 A1 | * | 7/2002 | Miller et al. | 345/440.1 |

FOREIGN PATENT DOCUMENTS

JP 10-049133 2/1998

* cited by examiner

Primary Examiner—Jeffery Brier
Assistant Examiner—J. Amini
(74) Attorney, Agent, or Firm—Louis J. Percello; David Aker

(57) ABSTRACT

To provide a data displaying method, a computer system, and a computer-readable recording medium.

A data displaying method employed for a computer system that includes a computer means 2 with a database DB; display means 3; and pointer means 4 for entering a position on the screen of the display means 3. The method includes a step of reading data from the database DB and plotting the data on the screen of the display means 3 with respect to the first variable so as to plot a main graph; a step of deciding whether or not an input from the pointer means 4 is a request for plotting data related to the second variable; a step of deciding coordinate data of a position of the main graph displayed on the screen of the display means 3; and a step of searching the coordinate data from the database DB.

18 Claims, 11 Drawing Sheets

[Figure 1]
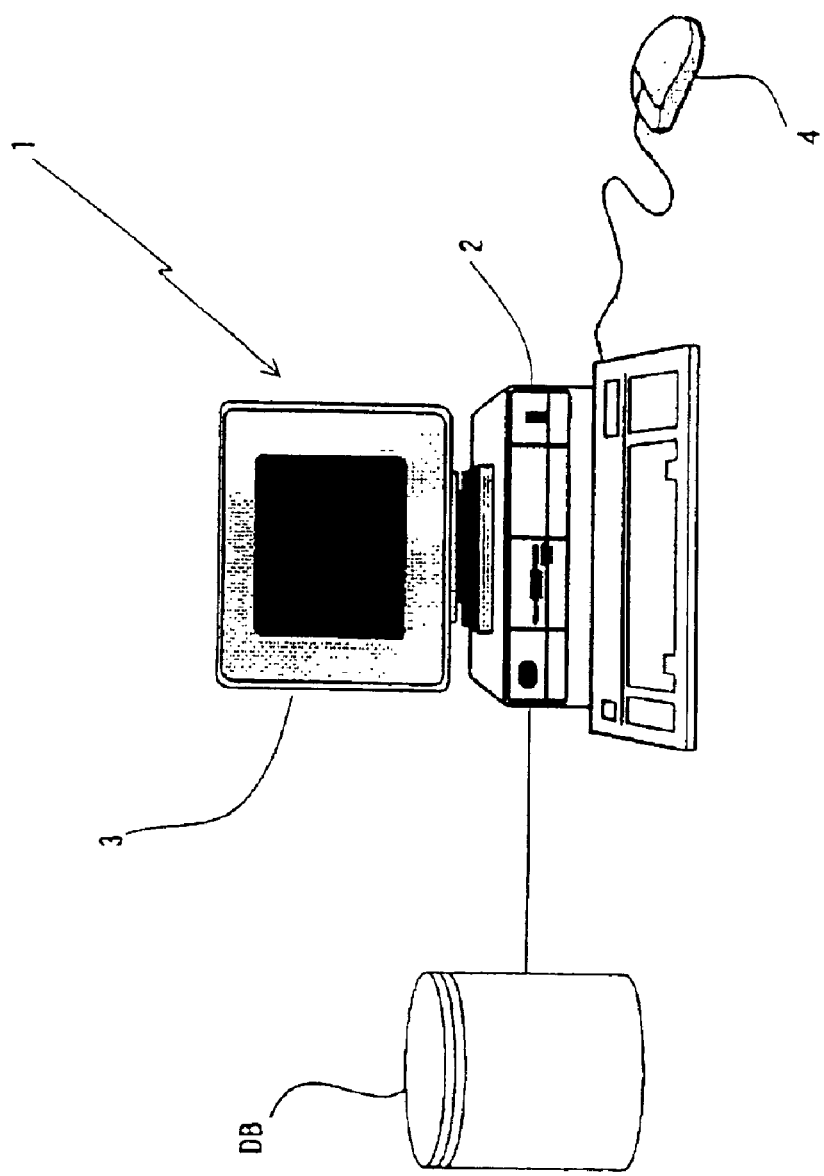

[Figure 2]
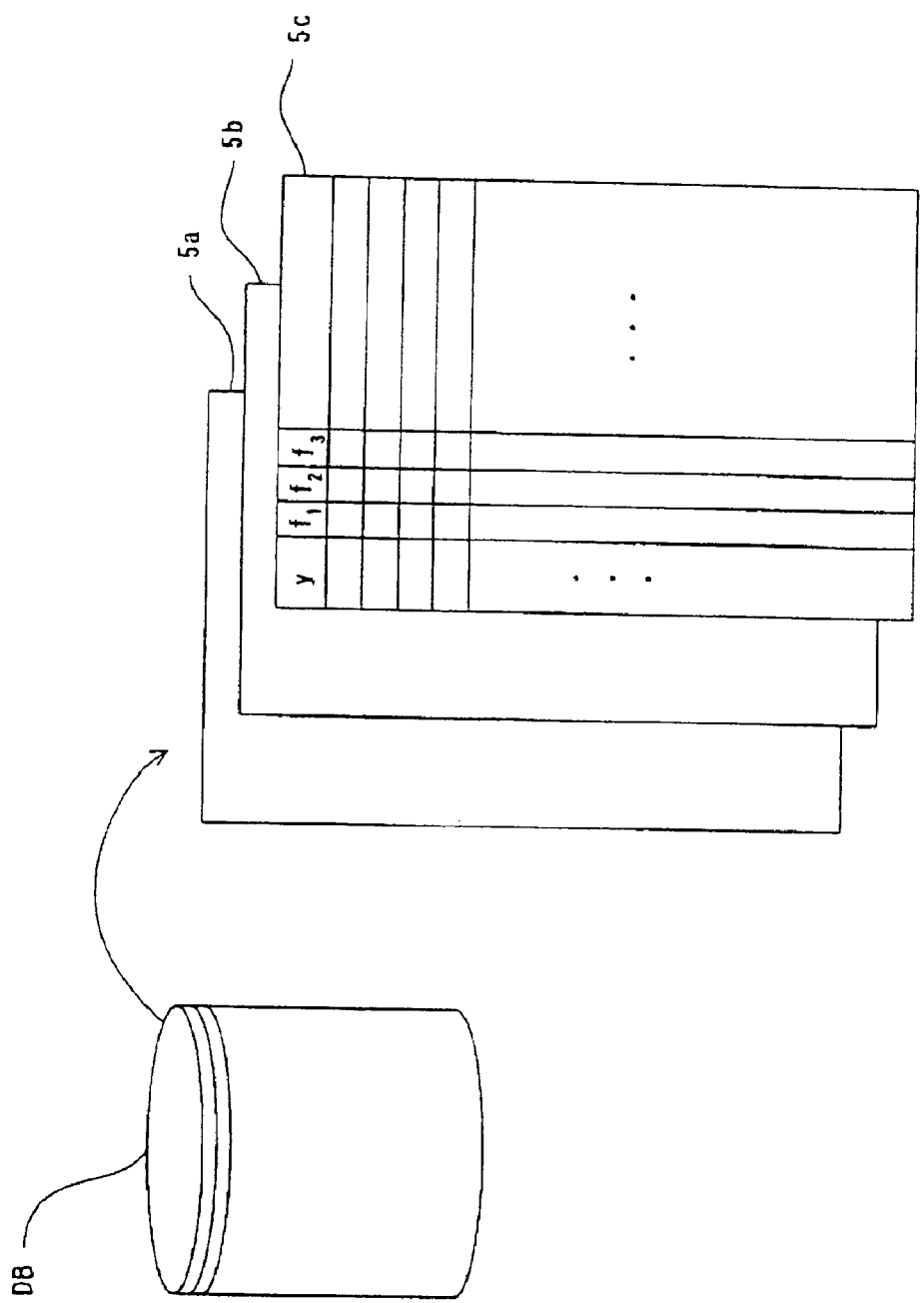

[Figure 3]

| $x=x_0$ | | | | | | | |
|---|---|---|---|---|---|---|---|
| y | $f_1$ | $f_2$ | $f_3$ | $f_4$ | $f_4$ | $f_5$ | $f_6$ |
| 0.03 | 0 | 0 | 0 | 3 | 0 | 0 | 5 |
| 0.05 | 0 | 0 | 0 | 12 | 0 | 0 | 14 |
| 0.10 | 0 | 10 | 11 | 24 | 0 | 0 | 26 |
| 0.15 | 0 | 19 | 18 | 30 | 0 | 0 | 33 |
| 0.20 | 7 | 27 | 23 | 35 | 0 | 0 | 38 |
| 0.25 | 13 | 32 | 26 | 39 | 0 | 0 | 41 |
| 0.30 | 18 | 37 | 29 | 42 | 0 | 0 | 45 |
| 0.35 | 23 | 42 | 31 | 45 | 3 | 2 | 48 |
| 0.40 | 25 | 45 | 33 | 47 | 6 | 9 | 51 |
| 0.45 | 26 | 49 | 35 | 48 | 9 | 14 | 53 |
| 0.50 | 26 | 51 | 36 | 50 | 12 | 19 | 56 |
| 0.55 | 26 | 54 | 37 | 51 | 14 | 24 | 58 |
| 0.60 | 27 | 56 | 38 | 53 | 15 | 28 | 60 |
| 0.65 | 28 | 57 | 38 | 54 | 17 | 32 | 61 |
| 0.70 | 29 | 59 | 38 | 55 | 18 | 35 | 63 |
| 0.75 | 30 | 60 | 38 | 56 | 20 | 37 | 64 |
| 0.80 | 31 | 61 | 38 | 57 | 20 | 39 | 65 |
| 0.85 | 33 | 61 | 36 | 57 | 21 | 40 | 66 |
| 0.90 | 35 | 62 | 32 | 58 | 22 | 41 | 66 |
| 0.95 | 37 | 62 | 16 | 59 | 21 | 43 | 67 |
| 1.00 | 40 | 63 | 33 | 59 | 21 | 44 | 68 |
| 1.05 | 43 | 64 | 41 | 60 | 18 | 45 | 69 |
| 1.10 | 46 | 65 | 47 | 60 | 11 | 47 | 70 |
| 1.15 | 49 | 67 | 51 | 60 | 13 | 48 | 71 |
| 1.20 | 53 | 68 | 55 | 61 | 25 | 50 | 73 |
| 1.25 | 56 | 69 | 59 | 61 | 32 | 52 | 74 |
| 1.30 | 60 | 71 | 63 | 62 | 38 | 55 | 75 |
| 1.35 | 65 | 72 | 68 | 63 | 44 | 59 | 78 |
| 1.40 | 70 | 75 | 73 | 67 | 50 | 64 | 82 |
| 1.45 | 78 | 81 | 82 | 77 | 59 | 73 | 90 |
| 1.50 | 91 | 92 | 95 | 91 | 73 | 86 | 102 |
| 1.55 | 77 | 78 | 81 | 79 | 60 | 72 | 88 |
| 1.60 | 72 | 75 | 77 | 76 | 57 | 68 | 83 |
| 1.65 | 70 | 75 | 75 | 75 | 55 | 67 | 81 |
| 1.70 | 68 | 76 | 74 | 75 | 54 | 67 | 80 |
| 1.75 | 67 | 77 | 73 | 75 | 54 | 67 | 81 |
| 1.80 | 66 | 78 | 73 | 75 | 54 | 69 | 82 |
| 1.85 | 66 | 80 | 72 | 76 | 54 | 71 | 84 |
| 1.90 | 66 | 82 | 72 | 76 | 54 | 73 | 86 |
| 1.95 | 66 | 85 | 72 | 78 | 54 | 76 | 88 |
| 2.00 | 66 | 89 | 72 | 80 | 54 | 80 | 92 |

5a

[Figure 4]
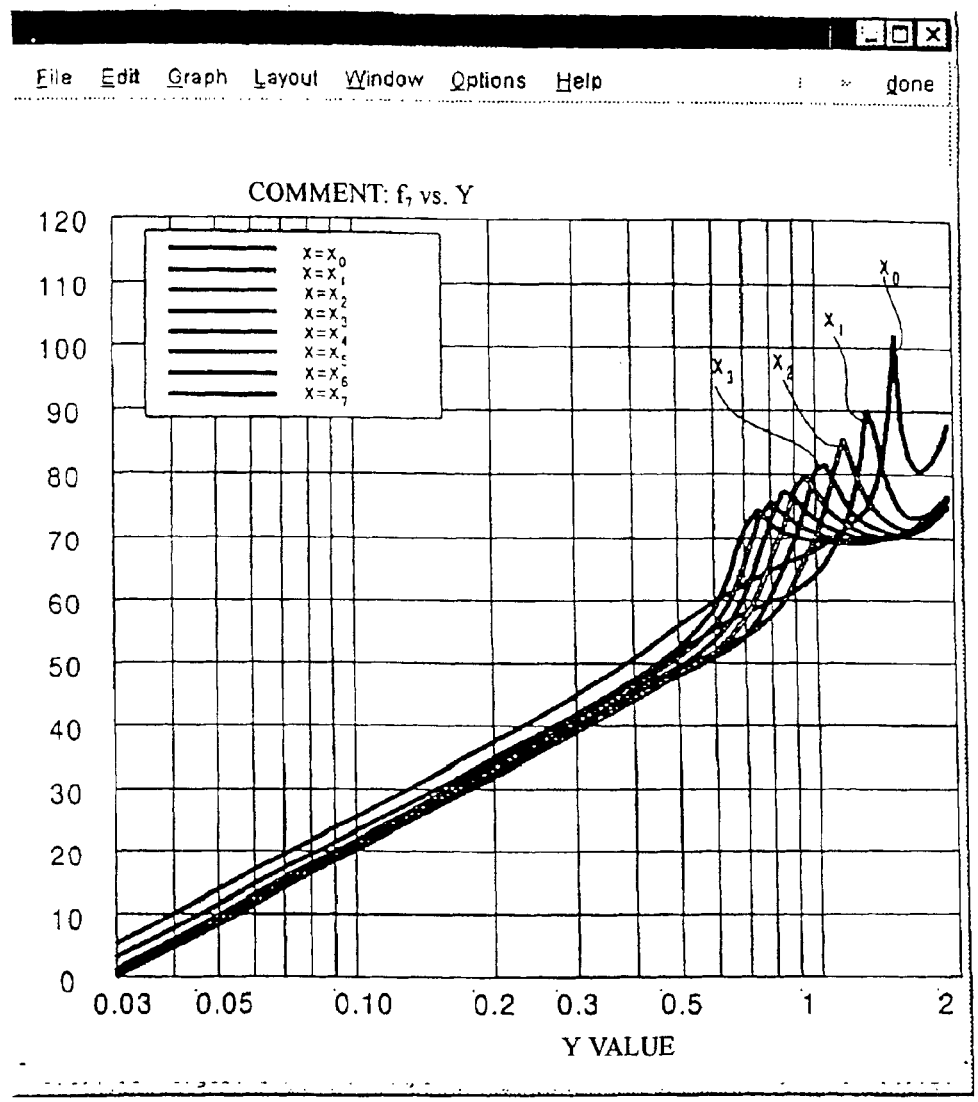

[Figure 5]
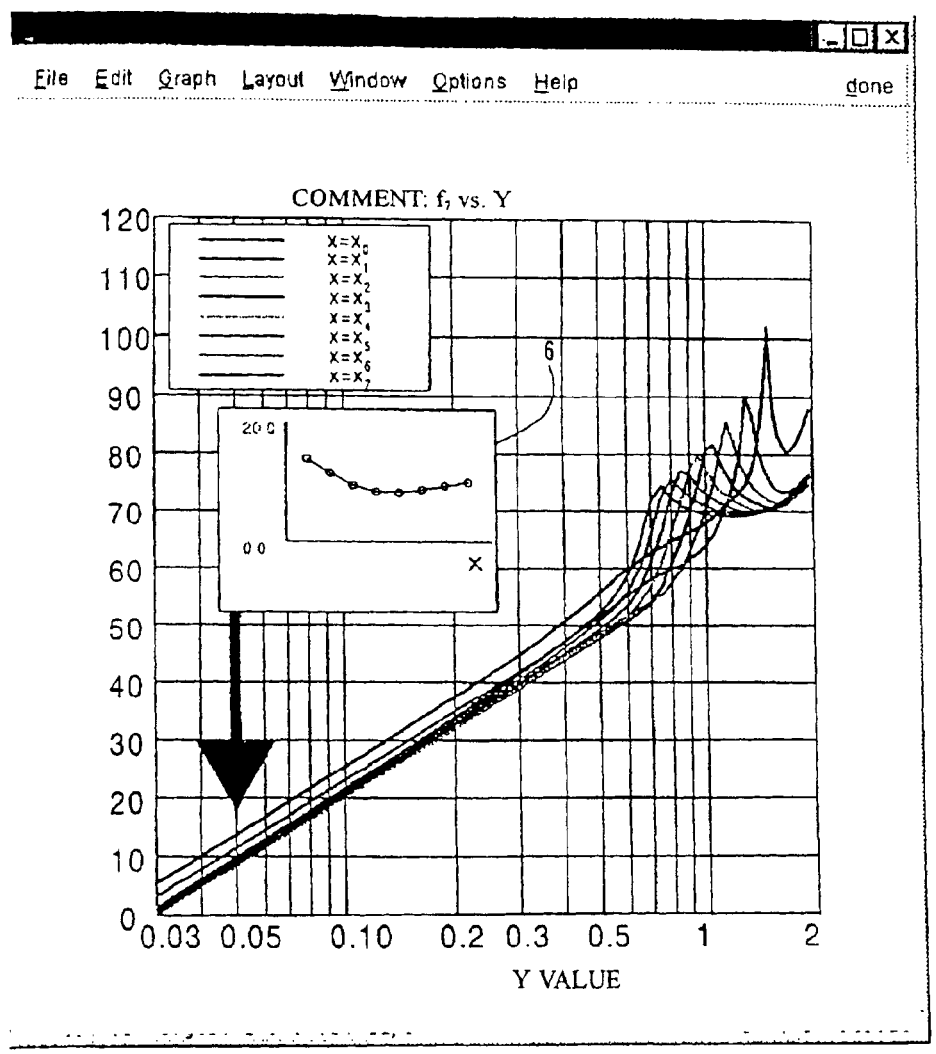

[Figure 6]
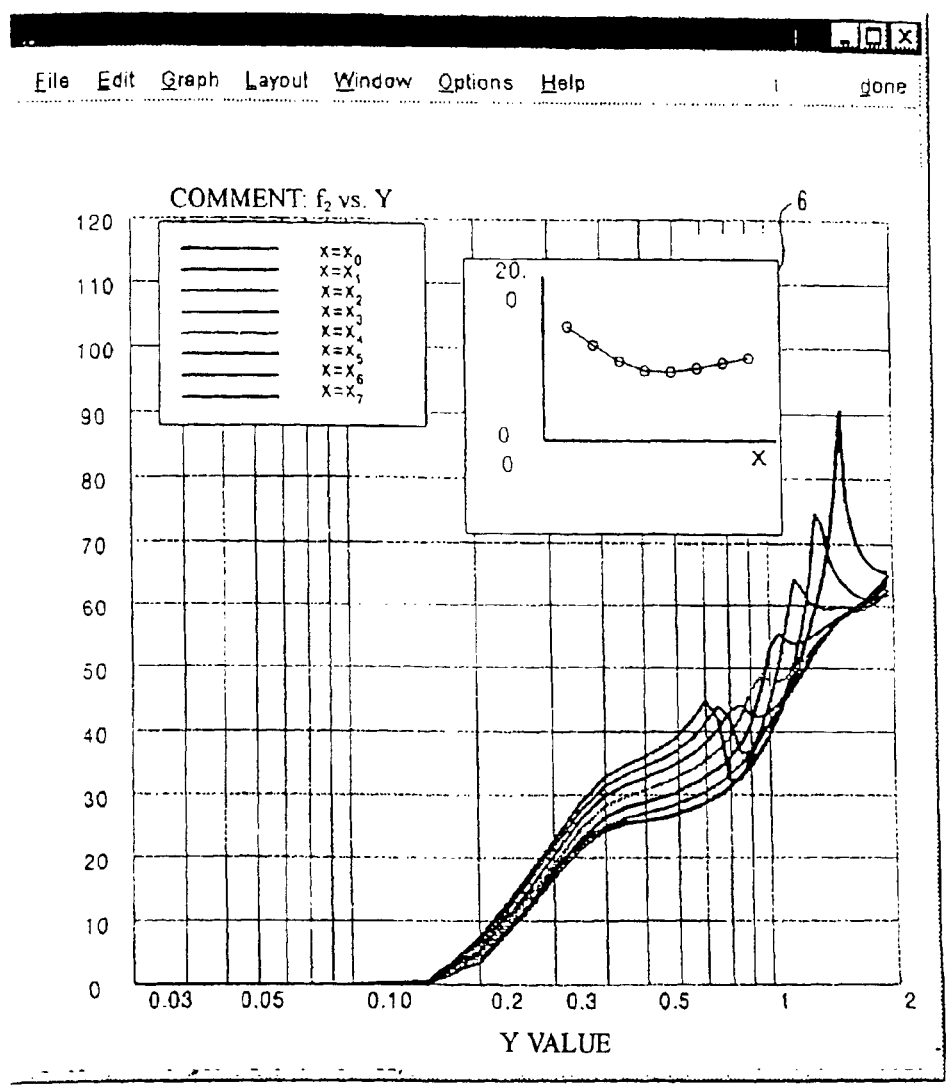

[Figure 7]
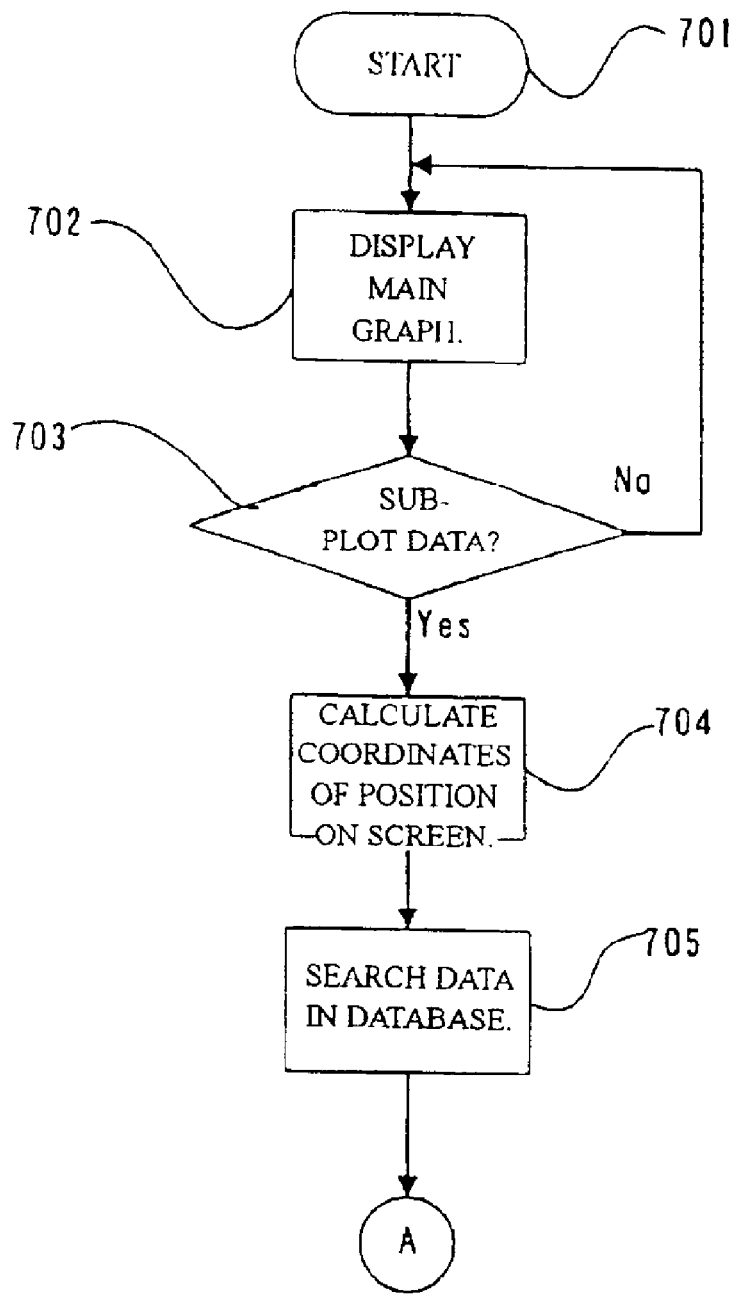

[Figure 8]

[Figure 9]
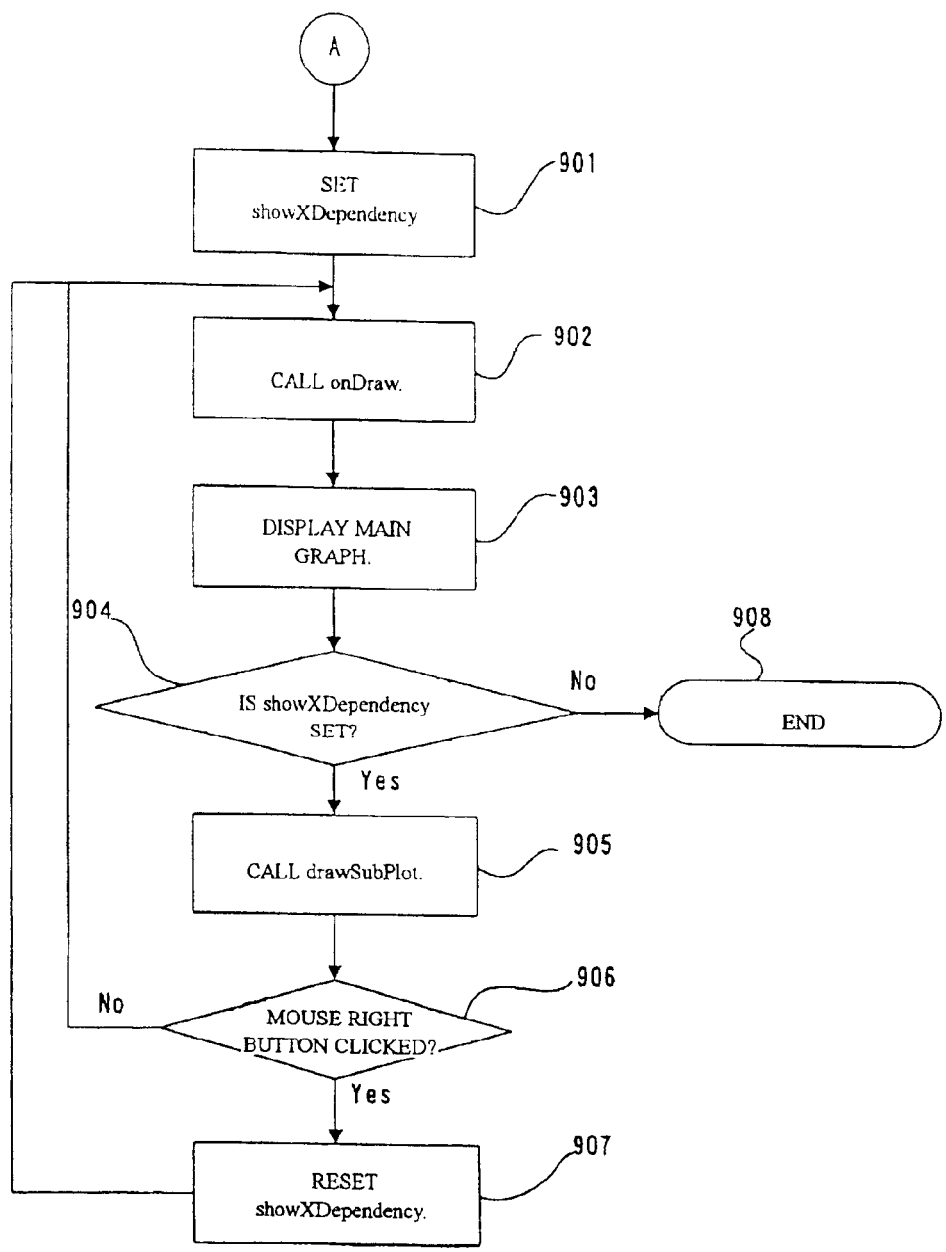

[Figure 10]

CMomentView class pseudo code

[Main Routine]
// definition
xData: CMomentDoc data
xIndex: an index denoting a specificCMomentData
selection: specification of one of $f_1, f_2, f_3, ...$ to be displayed on the main graph
showXDependency: a flag denoting whether to display sub-plotted data
subPlotPosition: a position for displaying sub-plotted data // Processing // 1. Obtaining a display screen size
getScreenSize()

// 2. Setting items on the main graph, such as horizontal axis range, vertical axis range, grid, plotting color, plotting line type, font, etc.
setMainGraphAttribute()

// 3. Calculating place and size for drawing a graph
setGraphPositionAndSize()

// 4. Reading xData
getData(xData, xIndex)

// 5. Displaying part of xData selected by "selection" on the main graph
drawMainGraph(xData, xIndex, selection)

// 6. Displaying sub-plotted data
drawSubPlot(xData, xIndex, selection, showXDependency, subPlotPosition);

[Figure 11]

DETAILS OF SUBROUTINE drawSubPlot()

// definition
subPlotYIndex: an index denoting the position of a variable Y to be isolated by sub-plotting
subPlotY[]: a value of data to be sub-plotted // 6.1 When displaying sub-plotted data
   if(showXDependency) {
      // 6.1.1 Selecting the position of a variable Y to be sub-plotted
         subPlotYIndex=setSubPlotY();
     // 6.1.2
        For example, in order to reference to the data in the variable Y of the CMomentData class instance denoted by xIndex, selected in 6.1.1 at selection=$f_i$;
        xData -> setIndex(xIndex);
        xData ->X() -> setIndex(subPlotYIndex);
        subplot[xIndex]=xData ->X() -> f1();
        The above processings are repeated for each instance of the CMomentData class specified by sub-plottingxIndex.

// 6.1.3 Setting size and position of sub-plotting
        For example, 1/4 height of the size of the main plotting in the vertical direction and size in the horizontal direction in proportion to the number of plotting parameters d. The position denotes a position where the mouse button is clicked.
     setSubPlotSize();

// 6.1.4 Setting both maximum and minimum values of the vertical axis of sub-plotting
        For example, the values are set to be equal to the maximum and minimum values of data which exhibit the maximum and minimum values.
     setSubPlotAttribute();

// 6.1.5 Drawing sub-plotting
        drawSubPlot()
} // end of if (showXDependency)

METHOD FOR DISPLAYING DATA ON COMPUTER SYSTEM

DETAILED DESCRIPTION OF THE INVENTION

1. Field of the Invention

The present invention relates to display of data stored in a database, more particularly to a data displaying method for displaying changes of data with respect to a plurality of variables in case changes of the data stored in the database depend on a plurality of the variables. The present invention also relates to a computer system for executing the method and a recording medium for storing a computer-readable program for executing the data displaying method.

2. Background Art

There have been proposed many data displaying methods so far. Each of those methods displays data on a display screen by selecting it from among mass data stored in a database and plotting it with respect to target variables. For example, there is a well-known data displaying method. According to the method, in case data stored in a database is represented by a relationship of f=F(x, y), the x value is fixed to such a certain value as $x_0$ and the f=F($x_0$, y) value is plotted with respect to y, thereby the data given by a plurality of variables as described above is displayed two-dimensionally. This data displaying method can display the f value given by a plurality of variables two-dimensionally, but it has been confronted with a problem that it is impossible to know how the f value is to be changed in case x takes a value other than $x_0$.

There is also proposed a data displaying method. According to the conventional method, the user or the system specifies $x_0$ according to a certain reference so as to be displayed in a window that displays f=f($x_0$, y) two-dimensionally. The window is displayed separately from another window that displays f=F(x, y) three-dimensionally. This conventional method arises a problem that the user must look away from the main graph in case he/she displays data on another screen, so that the displaying method is not effective so much.

There is still another proposed data displaying method. According to the method, a specific set of variables is extracted from data stored in a database so as to be plotted in three dimensions in a window once. Then, other variables are defined and a cross section of the three-dimensional plot taken at a predetermined value is displayed in another window. The method, however, is not so effective, since it requires the user to use a mass of such calculating resources as a calculation time, a storage capacity, a processor (CPU), etc. Because the method also creates a macro additionally so as to graph data in a spread-sheet program, etc., the procedures are complicated and this makes it difficult to display changes of the f value simultaneously according to the changes of a specific variable while data is plotted with respect to the main necessary parameters.

PROBLEMS TO BE SOLVED BY THE INVENTION

Under such circumstances, it is an object of the present invention to provide a data displaying method that can solve the above conventional problems and make it easier to visualize data to be changed in dependence on a plurality of variables accurately, simply, and effectively. It is another object of the present invention to provide a computer system that carries out the data displaying method and a computer-readable recording medium that stores a program for carrying out the data displaying method.

SUMMARY OF THE INVENTION

The above objects are thus achieved by the data displaying method, the computer system, and the computer-readable recording medium of the present invention.

Concretely, the data displaying method of the present invention is carried out by a computer system that includes a computer with a database; a display device; and a pointer for entering a position on the screen of the display device. The data displaying method comprises a step of displaying a main graph by reading data from the database and plotting the data on the screen of the display device with respect to a first variable; a step of deciding whether or not an input from the pointer is a request for plotting data related to a second variable; a step of deciding coordinate data of a position of the main graph displayed on the screen of the display device; and a step of searching the coordinate data from the database. It is therefore possible to identify object data stored in the database accurately from the plotted main graph when it is displayed. Furthermore, in case an input from the pointer is a request for plotting data related to the second variable, the present invention enables the data displaying method to include a step of reading the coordinate data of the position from the database; a step of displaying a second window at a predetermined position on the screen of the display device that displays the main graph and a step of plotting the coordinate data of the position in the second window with respect to the second variable. This is why it is possible to sub-plot data including a data point identified accurately on the main graph according to a user request. The data displaying method can further include a step of displaying the second window while plotting of the data related to the second variable is requested from the pointer. Consequently, the data displaying method can stop the sub-plotting of data quickly in case the user does not need it any longer. The data displaying method of the present invention also enables the step of searching the coordinate data of a position in the database further include a step of calculating the coordinate value of the position so as to compare the value with the data value stored in the database. It is thus possible to identify any data stored in the database accurately from the coordinate data of the position on the main graph.

Furthermore, the computer system of the present invention includes computer means with a database; display means; and pointer means for entering a position on the screen of the display means. And, the computer system further includes means for displaying a main graph by reading the data from the database and plotting the data on the screen of the display means with respect to the first variable; means for deciding whether or not an input from the pointer means is a request for plotting data related to the second variable; means for deciding coordinate data of a position of the main graph displayed on the screen of the display means; means for searching the coordinate data of the position from the database; means for reading the coordinate data from the database; means for displaying the second window at a predetermined position on the main graph; and means for plotting the coordinate data of the position in the second window with respect to the second variable. This computer system can also include means for displaying the second window while plotting of the data related to the second variable is requested from the pointer means. Furthermore, the computer system of the present invention enables the means for searching the coordinate data of a position in the database to calculate a coordinate value of a position so as to compare the calculated value with the corresponding data value stored in the database.

Furthermore, the computer-readable recording medium of the present invention stores a program for carrying out the above data displaying method in the above computer system that includes computer means with a database; display means, and pointer means for entering a position on the screen of the display means. The computer program stored on the recording medium includes a step of displaying a main graph by reading the data from the database and plotting the data on the screen of the display means with respect to the first variable; a step of deciding whether or not an input from the pointer means is a request for plotting the data related to the second variable; a step of deciding coordinate data of a position of the main graph on the screen of the display means; and a step of searching the coordinate data of the position from the database. In case the input from the pointer means is a request for plotting data related to the second variable, the computer program stored on the recording medium of the present invention can further include a step of reading the coordinate data of a position from the database; a step of displaying the second window at a predetermined position on the main graph; and a step of plotting the coordinate data of a position in the second window with respect to the second variable. The computer program stored on the recording medium of the present invention can further include a step of displaying the second window while plotting of the data related to the second variable is requested by the pointer means. The computer program stored on the recording medium of the present invention also enables the step of searching the coordinate data of a position from the database to include a step of calculating a coordinate value of the position so as to compare the calculated value with the data value stored in the database.

PREFERRED EMBODIMENT

Hereunder, the preferred embodiments of the present invention will be described with reference to the accompanying drawings. The present invention is not limited only to those embodiments to be described below, of course; it may be modified freely without departing from the spirit of the invention.

FIG. 1 shows an embodiment of a computer system for executing the data displaying method of the present invention. The computer system 1 is configured by computer means 2, a display device 3 connected to the computer means 2 and used to display various data items, and pointer means 4 for issuing a command for reading coordinate data as needed from the main graph displayed on the screen of the display device 3, as well as issuing other various commands. While the pointer means 4 is a mouse in FIG. 1, it may be a stylus pen. Especially, the present invention also enables the pointer means to be configured by, for example, a cross line formed on the screen of the display device 3 and moved according to a key operation on a keyboard without using such the mouse/stylus pen. Any of those pointer means 4 can be selected appropriately to the operation environment of the computer system according to the present invention.

The computer means 2 of the computer system 1 shown in FIG. 1 may be a personal computer or work station, which employs such a CPU as PENTIUM (trademark of Intel Corporation) or a CPU compatible with that and operate such an operating system as WINDOWS (trademark of Microsoft Corporation), WINDOWS NT (trademark of Microsoft Corporation), OS/2 (trademark of IBM Corporation), AIX (trademark of IBM Corporation), UNIX LINUX, etc. Both of CPU and operating system are not limited only to those, of course.

While the computer system 1 in the embodiment of the present invention shown in FIG. 1 is a stand-alone one, it may be connected to another computer system as needed via a network. Such a network may be any one that could send/receive information in a remote mode through the communications, for example, the Internet, optical communications, LAN/WAN, etc. that use a proper communication protocol respectively. The communication protocol used for such the communications may also be the TCP/IP protocol. The communication protocol is not limited only to those, of course.

The computer means 2 included in the computer system 1 of the present invention as shown in FIG. 1 includes storage means (not illustrated). This storage means stores a database (DB) that stores data used for the data displaying method of the present invention.

FIG. 2 shows a structure of the data stored in the database DB shown in FIG. 1. In the data structure shown in FIG. 2, it is assumed that data values of $f_i$ depend on two variables, for example, variables x and y. According to the present invention, however, the number of variables, the number of $f_i$ values, and the characteristics of those variables are not limited specially. For example, it is also possible to use such a discrete value as a "serial No." for the variable x. And, it is also possible to use such a discrete or continuous value as a "frequency" for the variable y.

The data stored in the database DB shown in FIG. 2 is formed as a set of instances $5a$, $5b$, $5c$, . . . of a data class in which a series of data values $f_i$ with respect to x values are stored so as to correspond to changes of y in case the value in the variable x is changed $x_0$, $x_1$, $x_2$, $x_3$, . . . in a discrete manner like. FIG. 3 shows a data structure of a data class in detail when the instance $5a$ of the data class in the database DB shown in FIG. 2 is taken as an example.

As shown in FIG. 3, in the data class $5a$ stored in the database DB used by the present invention, $f_i$, for example a measured data value, which corresponds to each discrete value of the variable Y, is stored in each field. And, in the instance $5a$ of the data class shown in FIG. 3, each data value $f_i$ corresponding to a predetermined y value forms a record.

FIG. 4 shows an example of the main graph displayed according to the present invention. According to the present invention, the main graph means each data value $f_i$ plotted with respect to a variable, which is targeted by the user of the computer system 1 at that time. The main graph is not decided uniquely, but it can be selected by the user as needed according to the type of the variable, etc. For the main graph in the embodiment of the present invention shown in FIG. 4, the horizontal axis plots the variable Y and the vertical axis plots, for example, the $f_7$ value corresponding to the predetermined $x_j$ shown in FIG. 3 (j=a positive integer including 0). In FIG. 4, data is plotted in correspondence to the $f_7$ value. For example, a color is changed to another on the screen of the display device 3 in case the variable $x_j$ is changed $x_0$, $x_1$, $x_2$, $x_3$, . . . in a discrete manner like. The main graph shown in FIG. 4 makes it possible to check the change of each data value $f_7$ to be caused by the change of the variable Y accurately enough. In case it is required to make a decision further in detail with use of data, it is required sometimes to know how each data value $f_7$ is changed at a predetermined Y value when the variable X is changed.

It is a conventional way that the horizontal axis takes a variable x so as to create and display another window in the above case. The above conventional method, however, cannot answer quickly and effectively to a user's question that how the variable X is to be changed at a specific data point existing, for example, on the main graph. And, the user must turn his/her eyes away from the screen of the main graph when executing such operations as displaying another window and/or identifying a variable to the computer system 1. Those troublesome operations will make the user feel that the operation efficiency is very low. This is why the user comes to demand a more efficient method, thereby he/she can come to display, for example, changes of the data value $f_1$ with respect to another variable at a specific data point displayed on the main graph on the screen of the display 3 without turning his/her eyes away from the main graph.

FIG. 5 shows how data is displayed in the embodiment of the present invention. In FIG. 5, it is premised that the vertical axis plots the data value $f_7$ and the horizontal axis plots the first variable Y. In the embodiment of the present invention shown in FIG. 5, the second window 6 is overlaid on the main graph described above and data is sub-plotted in the second window so as to denote how the data value $f_7$ is changed with respect to the second variable. The plotted data displayed in this second window 6 is assumed to be the data value $f_7$ in the variable Y denoted by an arrow plotted with respect to the second variable X in FIG. 5. A position denoted by an arrow here can be specified with the pointer means 4 for any value in the variable Y marked by the user. The second window 6 displayed according to the present invention can be used as, for example, a pop-up window on the main graph and disappeared when it is not needed.

In the embodiment of the present invention, this second window 6 can be kept displayed until the display request is terminated so that the window 6, when a mouse is used as the pointer means 4, is displayed by clicking the left button of the mouse and kept displayed until the right button of the mouse is clicked again.

Furthermore, in another embodiment of the present invention, it is also possible to continue the display of the second window 6 while the mouse click is continued. When the mouse click is ended, the display request is regarded to be ended, thus the display of the second window 6 is terminated. The sub-plotted data displayed in the second window 6 according to the present invention as described above is configured so as to plot a specific $f_i$ value corresponding to the main graph displayed at that time with respect to the second variable.

FIG. 6 shows the main graph in another embodiment of the present invention, in which the display data is changed from the data value $f_7$ to $f_2$ stored in the data class 5a shown in FIG. 3 respectively in the embodiment of the present invention shown in FIG. 5. Such a main graph change, when a mouse is used as the pointer means 4, is done by clicking the left button of the mouse on the main graph when the $f_i$ data is not plotted thereon. And, each time the left button of the mouse is clicked, the display field can be changed sequentially to $f_2$, $f_3$, $f_4$, . . . at the $f_i$ data value shown in FIG. 3. In such a case, the sub-plotted data in the second window can also be changed sequentially to $f_2$, $f_3$, $f_4$, . . . in accordance with the change.

FIG. 7 is a flowchart for describing the data displaying method of the present invention. The data displaying method of the present invention begins a processing in step 701 and data is read from, for example, the $f_1$ data field with respect to the first variable Y at a predetermined second variable X value so as to plot a graph by displaying the variable Y on the horizontal axis and the $f_1$ data on the vertical axis in step 702. In case this processing is done repetitively with respect to a different second variable X, the main graph is plotted as shown in FIG. 4.

The main graph plotted as described above is then used to decide whether to sub-plot data in the second window in step 703 according to the data displaying method of the present invention. This decision, for example, is done according to whether or not the left button of the mouse (pointer means 4) is clicked in the embodiment of the present invention shown in FIG. 7. According to the present invention, data is sub-plotted in the displayed second window by moving the pointer means 4 to a desired point on the main graph and clicking the left button of the mouse (pointer means 4) there.

According to the data displaying method of the present invention, coordinate data specified by the pointer means 4 in step 704 is decided on the screen of the display 3. It is, therefore, possible to employ any other known methods as such the method in case the method standardizes a point on the screen of the display device 3, for example, on the main graph within a displayed data range, thereby calculating coordinate data specified by the pointer means 4.

Then, a record and a field in which object data is stored is searched from the database DB. The object data is the closest one of the data stored in the database DB, which corresponds to the data value calculated from the coordinate data in step 705 as described above. When searching such the data closest to the data value, various references can be used. For example, it is possible to use an absolute difference from the first variable Y among the calculated data values. It is also possible to use a two-dimensional distance that uses the calculated data values and $f_i$ and Y data stored in the database DB as references for searching such the data closest to the above data value. Furthermore, according to the present invention, it is possible to use any reference value that can denote a difference between calculated data and data stored in the database DB. The data calculated from this coordinate data is stored in such a storage means as a memory once, then it is sub-plotted later as to be described with reference to FIGS. 9 and 11.

Furthermore, according to the another embodiment of the data displaying method of the present invention, in case the above-described closest data is not within, for example, a predetermined threshold, it is possible to change the data value $f_i$ as shown in FIG. 6 on the screen of the display device 3 instead of displaying the second window by clicking the left button of the mouse.

In addition to the embodiment shown in FIG. 7, the step of calculating data related to the above coordinate data of a position can also be included in a sub-routine for sub-plotting data as to be described later with reference to FIG. 9. The step can be included in any other step as long as the effect of the present invention is assured.

As described above, searching the data closest to the data value calculated from coordinate data of a position on the screen of the display device 3 as described above makes it possible to decide both of a predetermined field and a predetermined record in a data class in which data is to be sub-plotted by the user is stored.

Figure 8:
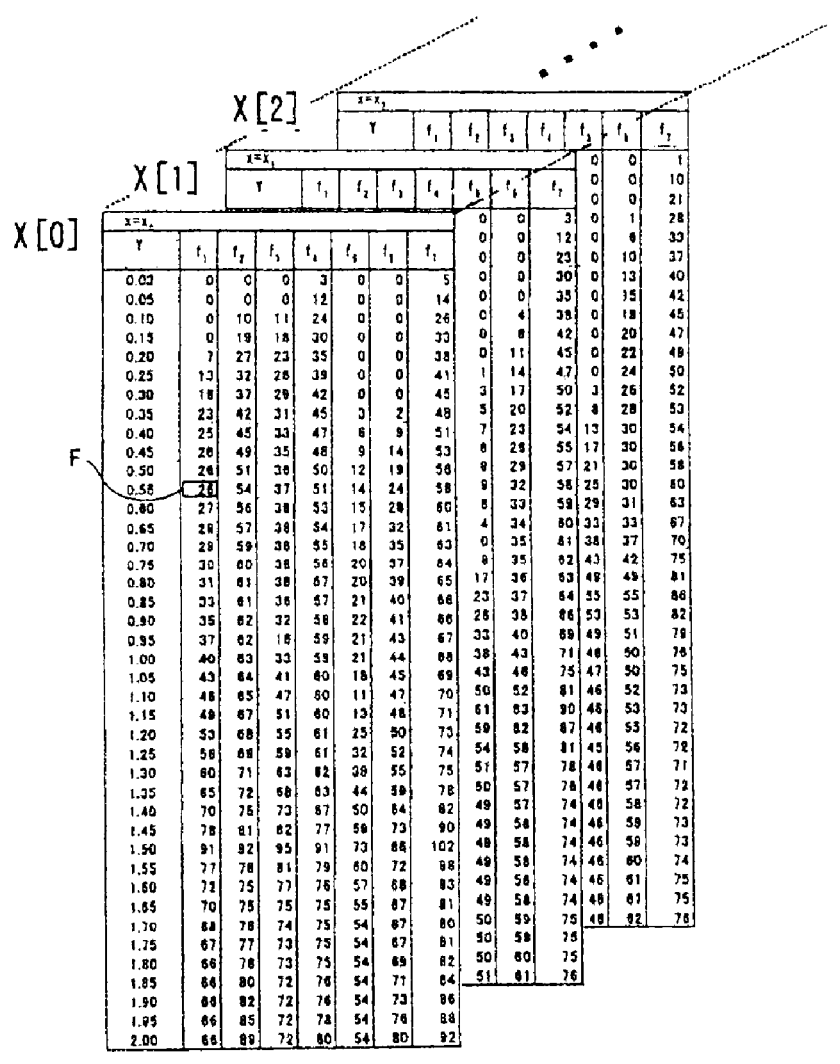

FIG. 8 shows the data stored and searched in the database DB as described above and a detailed structure of the database DB employed for the present invention. In the database DB employed for the present invention shown in FIG. 8 is defined CMomentData, which is a data class that stores a data value $f_i$ in relation to the first variable Y and are stored a plurality of instances X[0], X[1], X[2], ... in the class configured in correspondence to the second variable X. In the database DB is also stored CMomentDoc, which is a data class that puts those data items together therein. In FIG. 8, a data value corresponding to both field and record in the database DB, which is the closest to the data calculated from the coordinate data of a position described with reference to FIG. 7 is denoted by F. Concretely, as shown in FIG. 8, a point marked by the user on the screen of the display device 3 becomes data F(Y=0.55, $f_1$=26) in the embodiment of the present invention.

In the CMomentData class that defines a relation between Y and $f_i$ corresponding to an X value is held those data items as, for example, iY[ ] and if$_1$[ ] array member variables. In order to reference to the Y and $f_i$ values with respect to a specific position of the Y from this CMomentData class, an index of the Y position is used. For example, in case setindex( ) that specifies an index of a data value as a member function is defined, the first record for the first variable Y is specified at setindex(1). After this, for example, the first record Y value 0.03 can be referenced at a member function of Y( ) or the $f_1$ value 0 can be referenced at a member function of $f_1$( ). According to the present invention, the data reference by an index described above is just an example. The present invention makes it possible to use any other methods that can reference to member variables directly and more simply.

Furthermore, according to the present invention, a change of the second variable X is represented by a difference between instances of the CMomentData class. Concretely, the CMomentDoc class that denotes a database entirely includes CMomentData class instances corresponding to the variable X values $x_0$, $x_1$, ... Therefore, the CMomentData class instance corresponding to a specific X value is referenced by the index that denotes the instance number. For example, in case "n" is specified for an index of setIndex(n) (n: an integer over 1) with use of the data structure shown in FIG. 8, the n-th CMomentData class instance X[n] for the second variable is referenced. And, specific Y and $f_i$ values can be referenced for this instance with use of the above method. Data to be sub-plotted can thus be obtained.

FIG. 9 is an example of a flowchart for describing how to sub-plot data according to the data displaying method of the present invention. According to the data displaying method of the present invention, in case a mouse button is clicked in step 703 shown in FIG. 7, the data to be sub-plotted is searched and identified as described above. This processing can be executed in any step as described above. Then, control goes to step 901 so as to set "showXDependency", which is a flag for sub-plotting data. After this, control goes to step 902 so as to call the function "onDraw" for displaying a screen. The main graph is thus plotted on the screen in step 903.

Then, control goes to step 904 so as to decide whether or not the flag "showXDependency" is set. In case the flag is set, control goes to step 905 so as to call the function "drawSubPlot" and sub-plot data with reference to the data to be sub-plotted as described above. Control then goes to step 906 so as to decide whether to continue the display of the second window. In the embodiment of the data displaying method of the present invention shown in FIG. 9, this decision is done by checking whether or not the right button of the pointer means 4 (ex., a mouse) is clicked. Of course, the method of the present invention enables any other means to be used for this decision in case the method meets the requirement.

In the embodiment of the data displaying method of the present invention shown in FIG. 9, in case the right button of the pointer means 4 (ex., a mouse) is clicked (decision= NO) in step 906, control goes to step 907 so as to reset the flag "showXDependency". Control then jumps to 902 so as to display the main graph. And, in step 904, it is decided again whether or not the flag "showXDependency" is set. Because the flag "showXDependency" is still reset in step 907, it is decided that no data is sub-plotted in step 904. Then, the data display method of the present invention is exited in step 908.

In case the right button of the mouse is not clicked (decision=YES) in step 906, it means that the user requests displaying sub-plotted data. Therefore, the flag "showXDependency" is not reset and the data is sub-plotted on the main graph and in the second window again. As described above, the data displaying method of the present invention continues the display until the user stops the display in the second window in step 907.

FIG. 10 shows a pseudo code "CMomentView" for plotting the main graph according to the data display method of the present invention. In the pseudo code shown in FIG. 10 are used variables XData, xIndex, selection and showXDependency. The XData, xIndex and selection are used to point out a specific record in the DB. The showXDependency is used to decide whether to sub-plot data. In addition, another variable subPlotPosition is used so as to specify a position for displaying the second window and sub-plot data.

In the case of the processing of the pseudo code shown in FIG. 10, "getScreenSize( )" is used to specify a size of the display screen. Then, "setMainGraphAttribute( )" is used to set conditions required to display the main graph, such as setting of a horizontal axis range, a vertical axis range, a grid plotting color, a line type, a font, etc. Furthermore, "setGraphPositionAndSize( )" is used to calculate a place and a size of the main graph. After this, "getData(xData, xIndex)" is used to read a data value $f_i$ from a predetermined CMomentData class with reference to an index of xIndex. The data value $f_i$ is included in the CMomentDoc data class. Then, the data value $f_i$ selected from the data values $f_1$, $f_2$, $f_3$, ... of the read xData and specified by a variable "selection" that identifies a data value for displaying the main graph is displayed at "drawMainGraph(xData, xIndex, selection)", thereby the main graph appears on the screen of the display device 3.

FIG. 11 shows the pseudo code of the "drawSubPlot" to be executed by the data displaying method of the present invention. At first, this subroutine "drawSubPlot( )" defines the variable "subPlotYIndex" to which an index that denotes the first variable for displaying sub-plotted data is entered and the "subPlot[ ]" to which the value of the data to be sub-plotted is entered.

In 6.1, the first variable for sub-plotting is selected. In this processing, at first it is decided whether to sub-plot data in "if(showXDependency)". In case the flag "showXDependency" is set, the data is sub-plotted in the processings in and after 6.1.1. As shown in 6.1.1, at first, an index that denotes the first variable Y having the first variable value closest to a position where the mouse button is clicked as described above is read into "subPlotYIndex" with use of the function "setSubPlotY( )". Then, the instance X[xIndex] of the CMomentData class specified by xIndex is referenced in 6.1.2. Then, the data field specified by "selection" is referenced so as to enter the data to be sub-plotted to the Y position specified by subPlotYIndex is displayed with respect to the same instance. For example, to reference to the data in the first variable Y shown in 6.1.1 at selection =$f_1$, the data is entered as follows.

"xData->setIndex (xIndex);
xData->X( )->setIndex(subPlotYIndex);
subplot[xIndex]=xData->X( )->f 1( );"

Then, the processing is repeated only for sIndex as many times as the number of the second variable discrete values, thereby reading the data to be sub-plotted. As shown in FIG. 11, according to the present invention, it is possible to search a data value from the coordinate data, identify the data to be sub-plotted, and read the data by the sub-plotting subroutine. After this, in the case of the pseudo code shown in FIG. 11, both size and position of the sub-plotting is specified for "setSubPlotSize" in 6.1.3. Then, both maximum and minimum values of the vertical axis in the sub-plotting are set in 6.1.4. In order to specify and set those items, for example, it is also possible to use the ¼ height in the vertical direction of the main graph and the size in the horizontal direction corresponding to the number of variables for plotting as needed. Of course, the present invention makes it possible to use any other references for the above processings. And, the position for displaying the second window when in sub-plotting may be decided at a position where the button of the pointer means 4 (ex., a mouse) is clicked so as to request, for example, sub-plotting. Of course, the present invention makes it possible to use any other references so as to specify the position for displaying the second window.

Then, both maximum and minimum values of the vertical axis in the sub-plotting can be set for "setSubPlotAttribute( )" in 6.1.4 equally to, for example, both of decided maximum and minimum values. After this, the sub-plotted data is displayed at "drawSubPlot( )" in the pseudo code shown in FIG. 11.

As described above, the data displaying method of the present invention makes it possible to display the second window so as to be overlaid on the main graph effectively. And, the present invention can apply to such event driving type operating systems as Windows, Windows NT, OS/2, AIX Windows, etc. for drawing on a screen from a main loop event message. In addition, the data displaying method of the present invention can be installed as a module of an existing data drawing software program or an additional software program in the subject computer system. The present invention enables the method to apply to any computer systems that use software programs for processing program messages and drawing pictures on the screen. The data displaying method of the present invention can also apply to processings for handling such a discrete value as measured data, as well as continuous data represented by a predetermined function. The display screen obtained by the data displaying method of the present invention can be printed out by such proper output means as a laser printer, an ink jet printer, or the like.

Furthermore, the data displaying method of the present invention can be described with any object-oriented programming languages, such as the C++ language and the source code for executing this data displaying method can be stored on a computer-readable recording medium such as a floppy disk, a hard disk, a CD-ROM, a DVD, and a magnetic tape. And, the source code for executing the data displaying method of the present invention can also be stored on a medium to be transmitted.

While the present invention has been described in some embodiments shown in the accompanying drawings, the present invention is not limited only to those embodiments; for example, the hardware and software configurations, as well as the execution order in the program may be varied freely as long as the effects of the present invention are ensured.

BRIEF DESCRIPTION OF THE DRAWINGS

FIG. 1 is a schematic configuration of a computer system in an embodiment of the present invention;

FIG. 2 is a schematic structure of a database in the embodiment of the present invention;

FIG. 3 is a data class stored in the database in the embodiment of the present invention;

FIG. 4 is a main graph displayed on the screen of a display device according to the data displaying method of the present invention;

FIG. 5 is a graph displayed in the second window overlaid on the main graph shown in FIG. 4;

FIG. 6 is the main graph in another embodiment of the present invention;

FIG. 7 is a flowchart for describing the data displaying method of the present invention;

FIG. 8 shows data identified from both field and record, as well as a detailed structure of the database DB that stores data according to the present invention;

FIG. 9 is a flowchart continued from the flowchart of the data displaying method of the present invention shown in FIG. 7;

FIG. 10 is the pseudo code of a program for displaying the main graph according to the data displaying method of the present invention; and FIG. 11 is the pseudo code of the program "drawSubPlot" used in the present invention.

Description of Symbols
1 . . . Computer System
2 . . . Computer Means
3 . . . Display Device
4 . . . Pointer Means
5 . . . Data Class
6 . . . Second Window
DB . . . Database

What is claimed is:

1. A data displaying method for a computer system that includes a computer apparatus with a database; a display device; and a pointer for entering a position on the screen of said display device, comprising: displaying a main graph by reading data from said database and plotting said data on the screen of said display device with respect to a first variable for a plurality of values of a second variable; determining whether or not an input from said pointer is a request for plotting data related to said second variable; determining coordinate data of a position of said main graph displayed on said screen of said display device; searching coordinate data of said position from said database; and if said input from said pointer is a request for plotting data related to said second variable: reading coordinate data of said position from said database; displaying a window within said main graph while plotting of data related to said second variable is requested from said pointer; and plotting coordinate data of said position with respect to said plurality of values of said second variable in said window so that said data with respect to said first variable and said data with respect to said plurality of values of said second variable are simultaneously displayed.

2. The method according to claim 1, wherein said step of searching coordinate data of said position in said database further comprises:

calculating a coordinate value of said position; and comparing said value with a data value stored in said database.

3. The method according to claim 1, wherein said main graph is displayed within a first window, so that said plotting of coordinate data of said position with respect to said second variable is in a second window within said first window.

4. The method according to claim 1, wherein the database contains data values that are functions of at least two variables, the database having instances of a set of values of a first of the variables, each instance containing data values that are a function of other of the variables, wherein a position of said pointer with respect to an axis of said main graph selects data to be displayed from various ones of said instances.

5. The method according to claim 1, wherein said main graph and said window are displayed simultaneously.

6. The method according to claim 1, wherein said simultaneous display of said data with respect to said first variable and said data with respect to said second variable occurs without entry of data other than position of said pointer on said screen.

7. A computer system including a computer with a database; a display device; and a pointer for entering a position on the screen of said display device, said computer system comprising: a device for displaying a main graph by reading data from said database and plotting said data on the screen of said display device with respect to a first variable for a plurality of values of a second variable; a device for determining whether or not an input from said pointer is a request for plotting data related to said second variable; a device for determining coordinate data of a position of said main graph displayed on said screen of said display device; a device for searching coordinate data of said position from said database; a device for reading coordinate data of said position from said database; a device for displaying a window within said main graph while plotting of data related to said second variable is requested from said pointer; and a plotter for plotting coordinate data of said position with respect to said plurality of values of said second variable, so that said data with respect to said first variable and said data with respect to said plurality of values of said second variable are simultaneously displayed.

8. The computer system according to claim 7, wherein said device for searching coordinate data of said position in said database calculates a coordinate value of said position and compares said value with a data value stored in said database.

9. The computer system according to claim 7, wherein said main graph is displayed within a first window, so that said plotting of coordinate data of said position with respect to said second variable is in a second window within said first window.

10. The computer system according to claim 7, wherein the database contains data values that are functions of at least two variables, the database having instances of a set of values of a first of the variables, each instance containing data values that are a function of other of the variables, wherein a position of said pointer with respect to an axis of said main graph selects data to be displayed from various ones of said instances.

11. The computer system according to claim 7, wherein said main graph and said window are displayed simultaneously.

12. The computer system according to claim 7, wherein said simultaneous display of said data with respect to said first variable and said data with respect to said second variable occurs without entry of data other than position of said pointer on said screen.

13. A computer-readable recording medium, said medium storing a program for executing a data displaying method in said computer system that includes a computer with a database; a display device; and a pointer for entering a position on the screen of said display device, said method comprising: displaying a main graph by reading data from said database and plotting said data on the screen of said display device with respect to a first variable for a plurality of values of a second variable; determining whether or not an input from said pointer is a request for plotting data related to said second variable; determining coordinate data of a position of said main graph displayed on said screen of said display device; and searching said coordinate data of said position from said database; wherein if said input from said pointer is a request for plotting data related to said second variable, the method further comprises: reading coordinate data of said position from said database; displaying a window at a position within said main graph while plotting of data related to said second variable is requested from said pointer; and plotting coordinate data of said position in said window with respect to said plurality of values of said second variable, so that said data with respect to said first variable and said data with respect to said plurality of values of said second variable are simultaneously displayed.

14. The recording medium according to claim 13, wherein searching coordinate data of said position from said database comprises calculating a coordinate value of said position and comparing said calculated value with a data value stored in said database.

15. The recording medium according to claim 13, wherein said computer program further executes displaying said main graph within a first window, so that said plotting of coordinate data of said position with respect to said second variable is in a second window within said first window.

16. The recording medium according to claim 13, for use with a database containing data values that are functions of at least two variables, the database having instances of a set of values of a first of the variables, each instance containing data values that are a function of other of the variables, wherein said computer program causes a position of said pointer with respect to an axis of said main graph to select data to be displayed from various ones of said instances.

17. The recording medium according to claim 13, wherein said computer program causes said main graph and said window to be displayed simultaneously.

18. The recording medium according to claim 13, wherein said computer program causes said simultaneous display of said data with respect to said first variable and said data with respect to said second variable to occur without entry of data other than position of said pointer on said screen.

* * * * *